United States Patent
Warren et al.

(10) Patent No.: US 7,232,025 B1
(45) Date of Patent: Jun. 19, 2007

(54) ELECTROMAGNETIC CONVEYOR STOP

(75) Inventors: Lelan Warren, Dallas, TX (US); Luiz C. Harres, Allen, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/440,990

(22) Filed: May 25, 2006

(51) Int. Cl.
    *B65G 15/64* (2006.01)
(52) U.S. Cl. .................. 198/345.1; 193/35 A
(58) Field of Classification Search ............ 198/345.1, 198/345.3, 463.4, 464.1; 193/35 A
    See application file for complete search history.

(56) References Cited

U.S. PATENT DOCUMENTS

| | | | |
|---|---|---|---|
| 2,134,373 A | 10/1938 | Parker | 193/35 |
| 2,353,394 A | 7/1944 | Farmer | 211/49 |
| 2,669,377 A | 2/1954 | Van Poolen et al. | 226/88.1 |
| 2,738,103 A | 3/1956 | Bisese | 221/295 |
| 3,713,521 A | 1/1973 | Morltake | 193/37 |
| 3,970,180 A * | 7/1976 | Schlottmann et al. | 193/35 A |
| 4,219,114 A | 8/1980 | Kovacs | 198/780 |
| 4,397,386 A | 8/1983 | Kampf | 198/491 |
| 5,168,976 A * | 12/1992 | Kettelson | 198/345.3 |
| 5,860,505 A | 1/1999 | Metzger | 198/463.4 |
| 5,967,289 A | 10/1999 | Kelsey | 198/370.02 |
| 6,116,463 A * | 9/2000 | Telkamp | 221/298 |
| 6,223,875 B1 | 5/2001 | Malow | 193/35 A |

* cited by examiner

*Primary Examiner*—James R. Bidwell

(57) ABSTRACT

A conveyor stop assembly for stopping objects traveling along a conveying path includes a magnetically attractable stop member pivotally mounted for movement out of the conveying path when contacted by an object traveling along the conveying path and an electromagnet that generates an electromagnetic field that acts on the stop member to hold the stop member in the conveying path and stop an object traveling along the conveying path when the electromagnet is energized.

15 Claims, 4 Drawing Sheets

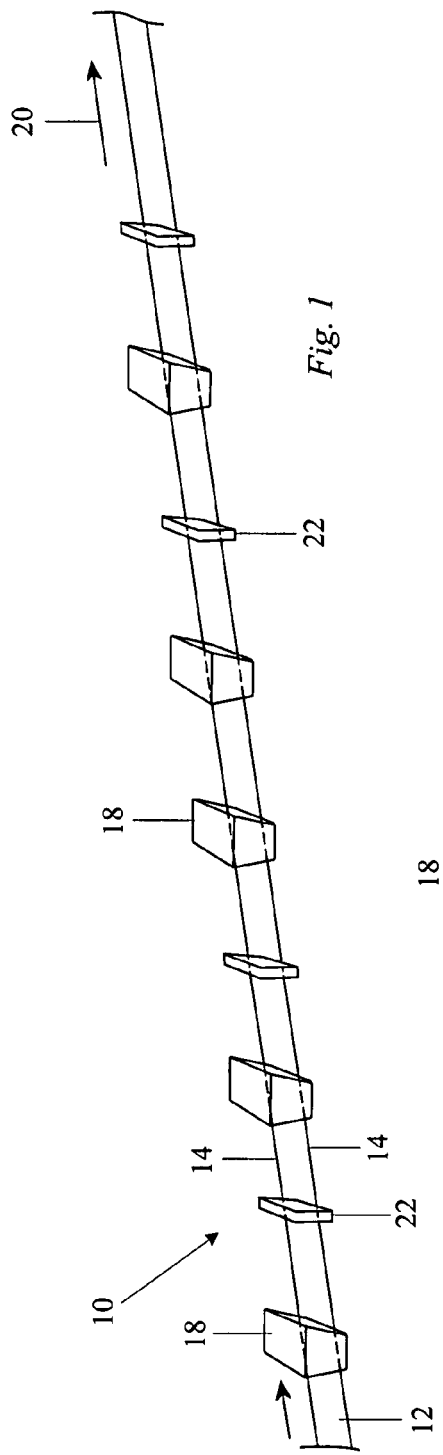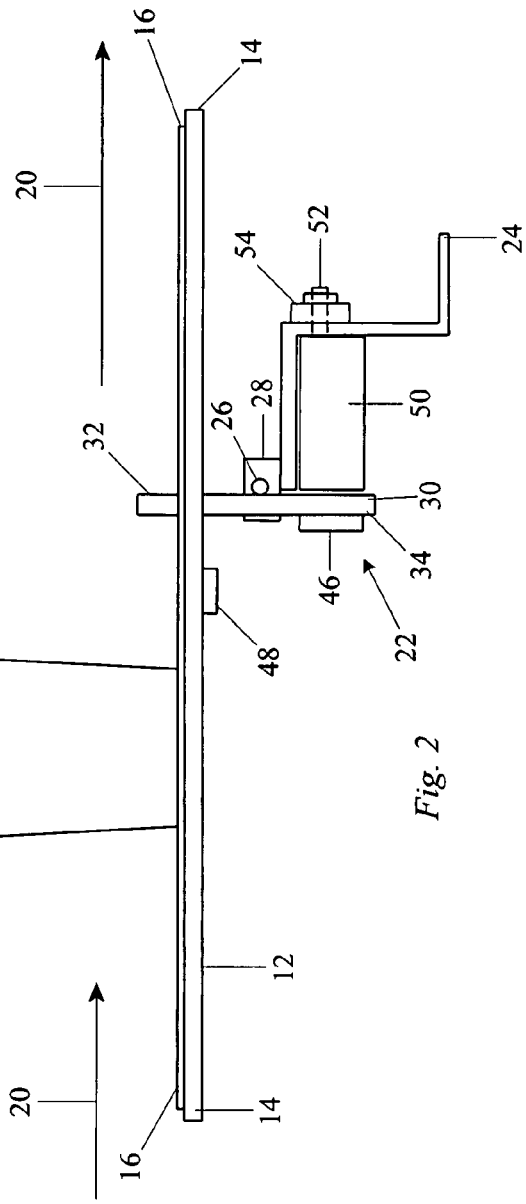

ELECTROMAGNETIC CONVEYOR STOP

TECHNICAL FIELD

The invention relates to conveying systems used to transport mail containers such as trays and tubs and, in particular, to a mechanical stop that is actuated with an electromagnet in order to stop and hold a selected container in position while the conveyor continues to operate, transporting other containers along the conveying path.

BACKGROUND OF THE INVENTION

Current mail handling processes utilized by the United State Postal Service and others rely on mail trays and tubs to hold and transport mail pieces during mail collection, sorting and distribution. For example, unsorted collected mail is often transported in mail tubs and sorted mail may be loaded into the tubs for carrier delivery. Due to the automated nature of current mail processing systems, these containers are routinely transported on conveyors to and from different locations and machines during mail processing operations. In some cases, it is necessary to accumulate empty containers on a conveyor, divert containers on or off the conveyor and/or load the containers while the containers are positioned on the conveyor. When accumulating containers on a conveyor, it may be necessary to stop one or more of the containers while continuing to run the conveyor in order to advance other containers on the conveyor.

Prior art devices used to stop and/or hold a container in position on a moving conveyor tend to be large mechanisms and/or include numerous moving parts. In the case of roller-type conveyors prior art designs included a pop-up roller that is raised into the path of oncoming objects on the conveyor. Other conveyor stop devices include pop-up mechanisms actuated with a solenoid or air cylinder. However, the useful lifetime of components such as solenoids and air cylinders is limited due to wear of seals, cylinders and other moving parts.

SUMMARY OF THE INVENTION

A conveyor stop assembly for use on a conveyor pathway on which objects travel includes a frame, an electromagnet mounted on the frame, a pivot, and a magnetically attractable stop member mounted for pivotal movement on the pivot. Actuation of the electromagnet causes the stop member to become held to the electromagnet by magnetic force in a position in which an end portion of the stop member extends into the conveyor pathway to stop an object moving along the conveyor. Deenergizing the electromagnet releases the stop member from the electromagnet such that an object moving along the conveyor can pass the stop assembly. In one aspect, the stop assembly includes means such as a spring or counterweight for causing the stop member, when released from the electromagnet, to pivot to a ready position. In the ready position, a contact portion of the stop member is in contact with or close proximity to the electromagnet, preferably with an end portion of the stop member extending into the conveyor pathway. In one variation, an object moving on the conveyor contacts the end portion of the stop member in passing and causes the stop member to pivot out of its way, after which the stop member pivots back to the ready position. In another, the stop member is clear of the conveyor pathway in the ready position and is brought into the pathway by energizing the electromagnet. The conveyor stop assembly of the invention is particularly suited to applications where empty and/or lightweight containers traveling on a conveyor must be queued, accumulated or otherwise temporarily stopped while the conveyor continues to run. These and other aspects of the invention are discussed further in the detailed description that follows.

BRIEF DESCRIPTION OF THE DRAWINGS

The invention will hereafter be described with reference to the accompanying drawings, wherein like numerals denote like elements, and wherein:

FIG. 1 is a schematic perspective view of a conveyor system employing a stop assembly according to the invention;

FIG. 2 is a side view of a conveyor and stop assembly according to the invention with the stop assembly in the ready position;

DETAILED DESCRIPTION

Figure 3:
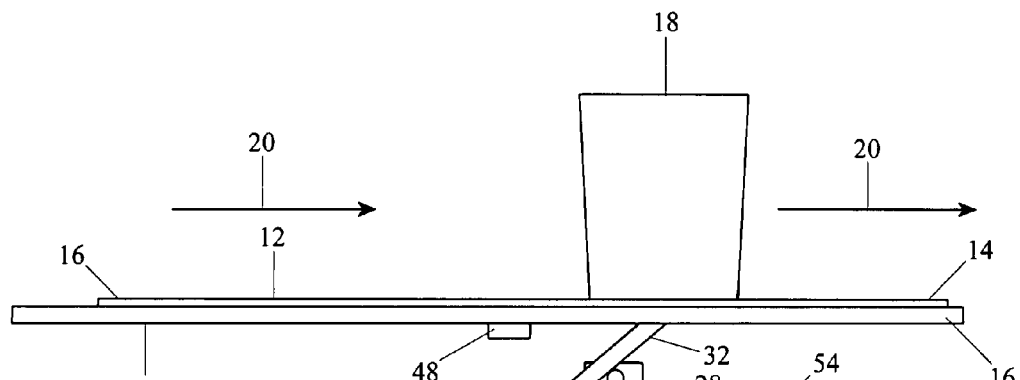
FIG. 3 is a side view of the conveyor and stop assembly of FIG. 2 wherein an object traveling along the conveyor is passing the assembly.

Referring to FIGS. 1–5, a conveying system 10 according to the invention includes a conveyor 12 including a pair of spaced apart parallel tracks 14 with a traveling belt or carrier 16 running on each of the tracks. The distance between tracks 14 is such that a mail tray or tub 18 can be placed across the tracks to be conveyed by belts 16 along a conveying path 20. As used herein, "conveying path" refers to the area occupied by, and through which, articles or objects travel along a conveyor. A plurality of conveyor stops 22 are arranged along the conveying path at locations where tubs 18 are removed from conveyor 12, either manually or mechanically. When actuated, conveyor stop 22 stops and holds tub 18 in position while conveyor 12 continues to operate. In this manner, a selected conveyor stop 22 can stop and hold one of tubs 18 in position while conveyor 12 continues to convey the remaining tubs 18 along conveying path 20. To reduce the friction between belts 16 and tub 18 when the tub is being held in position on moving conveyor 12, the upper surface of the belts is fabricated from, or coated with, a low friction material.

Figure 4:
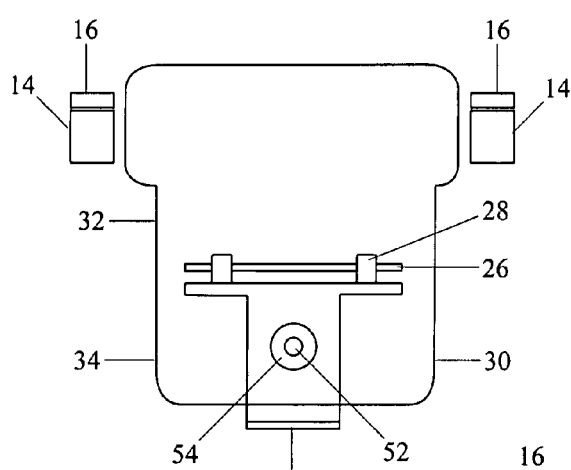
FIG. 4 is a rear view of the stop assembly FIG. 2.

Turning to FIGS. 2 to 4, conveyor stop 22 includes a frame or base 24 mounted between tracks 14, a shaft 26 pivotally mounted on the frame with bearings 28 and a stop member or paddle 30 mounted on the shaft. Stop paddle 30 includes a first and second end portions or wings 32, 34 extending on opposite sides of shaft 26. In the normal or ready position, first (upper) wing 32 extends into conveying path 20 with second (lower) wing 34 positioned below and outside of the conveying path. Stop paddle 30 is welded or otherwise fastened to shaft 26 midway along the height of the paddle such that the paddle pivots around a pivot axis below and substantially perpendicular to conveying path 20.

Bearings 28 may be formed from a suitable plastic or metal and are rigidly mounted on frame 24. As best illustrated in FIG. 3, shaft 26 is rotatable around the pivot axis such that first wing 32 can move out of conveying path 20 to allow an object such a tub 18 to pass. Cutouts 44 (FIG. 5) formed in stop paddle 30 allow the paddle to rotate around bearings 28.

Paddle 30 is fabricated at least in part from a magnetically attractable material such as steel and is provided with a counterweight 46 to bias the paddle in the ready or upright position. In the ready position, first wing 32 extends into conveying path 20 when not subjected to a pivoting force and a contact portion or second wing 34 is positioned adjacent to an electromagnet 50. Paddle 30 and counterweight 46 are sized such that a tub 18 traveling on conveyor 12 will pivot the paddle out of conveying path 20 and travel past the paddle unless the stop is actuated. Stop paddle 30 is sufficiently wide to prevent tub 18 from turning relative to conveying path 20 when the tub pushes against the paddle as it travels along the conveying path.

It should be noted that while counterweight 46 is shown herein as a separate part, it could just as effectively be incorporated into the bottom end of the paddle itself, or omitted entirely if the orientation and configuration of the paddle causes it to assume the position shown due to the force of gravity without need for a separate part identifiable as a counterweight. In such a case the associated "means" for causing the paddle to assume the ready position would be the orientation and weight distribution of the paddle and the position of the electromagnet relative to the contact portion of the paddle.

Electromagnet 50 mounted inside of frame 24 with a shaft or bolt 52 that extends through the frame. Stop 22 is actuated by energizing electromagnet 50 which generates a magnetic field that acts upon second wing 34 and/or counterweight 46 of stop paddle 30. Electromagnet 50 is sized to create a magnetic field of sufficient intensity to hold stop paddle 30 in position against the force applied to first wing 32 by tub 18 as conveyor 12 continues to run. In order to provide additional mass for electromagnet 50 to attract, counterweight 46 may be constructed of steel or a similar ferromagnetic material which also allows the use of a lighter stop paddle 30. A photocell 48 mounted adjacent conveyor 12 detects the presence of an article or object approaching or positioned at stop 22 to enable control of the stop with a control computer.

A damper 54 formed from a resilient material such as a rubber is mounted on bolt 52 against the outside of frame 24. Damper 54 allows electromagnet 50 to move a limited distance when the electromagnet is energized and tub 18 traveling on conveyor 12 impacts or pushes stop paddle 30. Allowing electromagnet 50 to move in this manner reduces the amount of force required to stop tub 18 traveling on conveyor 12 since the force is applied over the distance that damper 54 allows the electromagnet to move. Reducing the amount of force that electromagnet 50 must apply to stop tub 18 allows the use of a smaller or less powerful electromagnet. Alternatively, in an embodiment in which electromagnet 50 is rigidly mounted, a larger electromagnet is required since the electromagnet must apply a greater force on stop paddle 30 to stop tub 18. Damper 54 may also serve as shock absorber, dampening the impact of stop paddle 30 against electromagnet 50 when the paddle returns to the ready position after being pushed out of conveying path 20 by tub 18.

As illustrated, stop paddle 30 is mounted for movement independent of electromagnet 50 which acts on the paddle only when energized to create a magnetic field that holds the paddle in place. The use of electromagnet 50 to generate a magnetic field that holds stop paddle 30 in position eliminates the need for a mechanical linkage between the paddle and the electromagnet. The use of electromagnet 50 to hold stop paddle 30 in position also eliminates the need for solenoids, air or hydraulically actuated cylinders, motors and similar actuating means that incorporate wear prone moving parts and also require mechanical linkages. Eliminating such moving parts and linkages greatly increases the number of cycles or times that stop 22 can be actuated before repair or replacement is required.

When an electromagnet is de-energized, a certain amount of residual magnetism remains in the body of the magnet. The residual magnetism remaining in electromagnet 50 after the electromagnet has been de-energized may interfere with proper operation of conveyor stop 22. To eliminate or reduce such residual magnetism, the current to electromagnet 50 is reversed several times for a short period, for example several milliseconds.

In an alternate embodiment, stop paddle 30 and bearings 28 may be molded as a single piece from a suitable plastic. In this case, shaft 26 is rigidly mounted to frame 24 such that bearings 28 rotate on the shaft. Counterweight 46 is sized to provide the necessary mass of magnetically attractable material for electromagnet 50 to act upon when energized.

Figure 6:
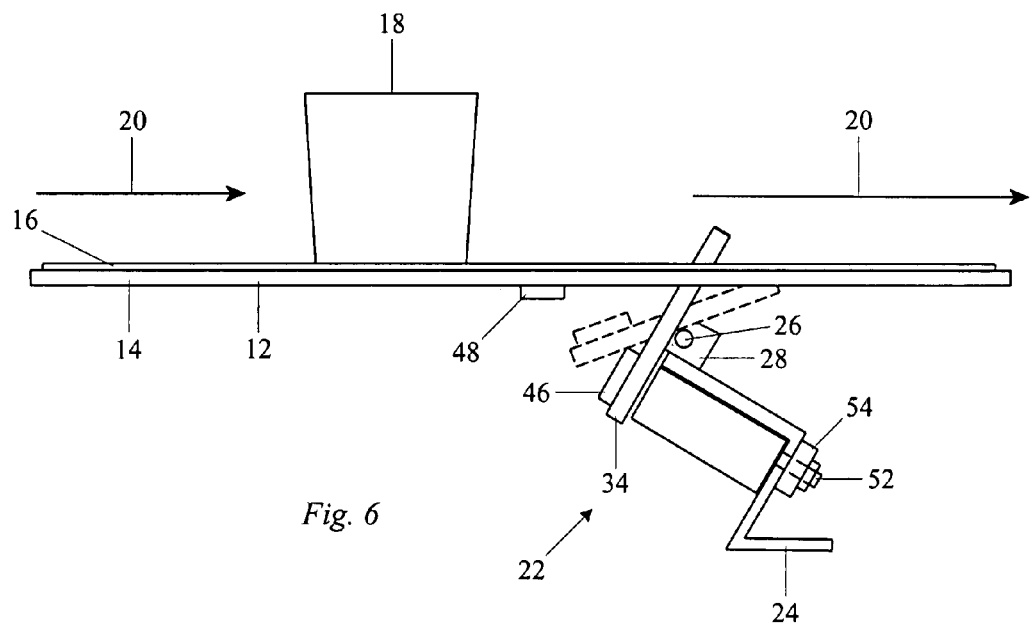
FIG. 6 is a side view of the conveyor and stop assembly of FIG. 2 showing an alternate mounting of the assembly.

Turning to FIG. 6, stop 22 may be mounted at an angle such that paddle 30 is angled relative to conveying path 20 in the ready position. As shown, paddle 30 is angled in the direction of travel of conveyor 12. Angling stop 22 in this manner reduces the amount of rotation that paddle 30 undergoes when pushed or impacted by tub 18 traveling along conveying path 20.

Figure 7:
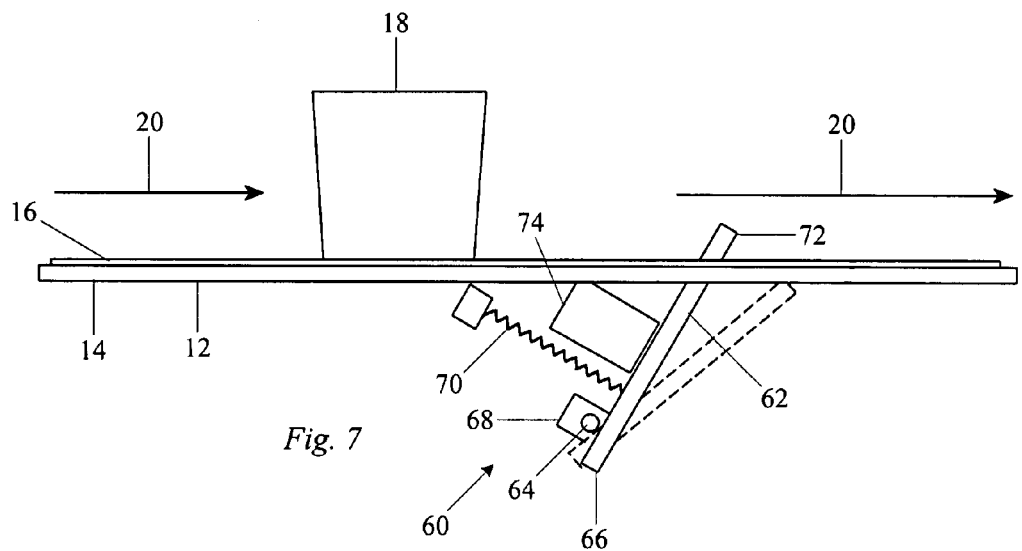
FIG. 7 is a side view of a conveyor and an alternate embodiment of a stop assembly of the invention.

FIG. 7 illustrates an alternate conveyor stop 60 including a magnetically attractable paddle 62 attached to shaft 64 mounted in bearing 68 and having a pivot axis adjacent a first (lower) end 66 of the paddle. A spring 70 biases paddle 62 such that second (upper) end 72 of the paddle is normally positioned in conveying path 20. Spring 70 is sized such that the force applied to paddle 62 by tub 18 traveling along conveying path 20 will normally push second end 68 of the paddle out of the conveying path, allowing the tub to continue along the conveying path.

Conveyor stop 60 includes an electromagnet 74 mounted adjacent paddle 62 which magnetically attracts the paddle when energized. The magnetic field created by electromagnet 74 applies sufficient force to paddle 62 to hold the paddle in position, stopping tub 18 while conveyor 12 continues to run. Due to the position of shaft 64 adjacent first end 66 of paddle 62, the amount of rotation of paddle 62 is reduced in comparison to the embodiment of FIG. 2.

Figure 8:
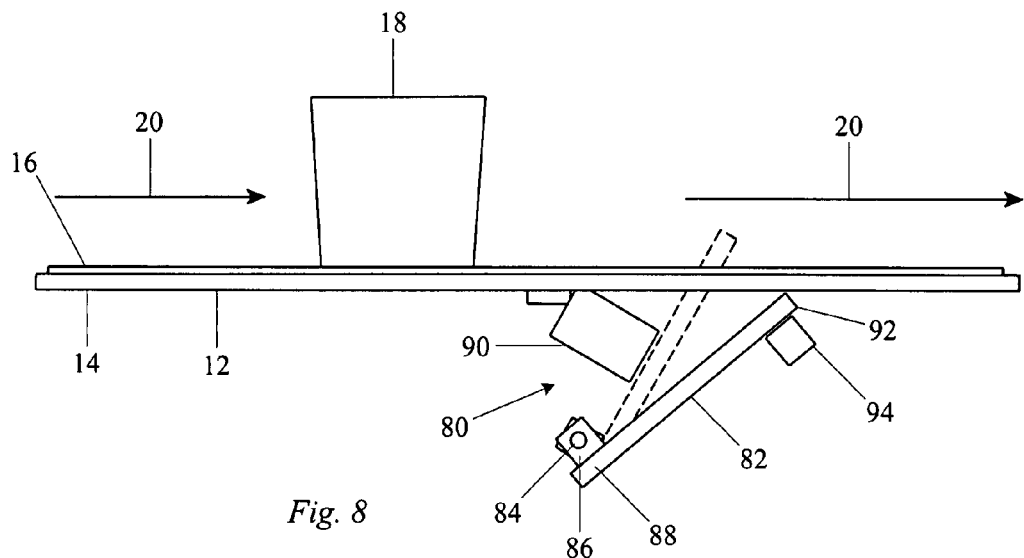
FIG. 8 is a side view of another alternate embodiment wherein a stop member of the invention is clear of the conveyor path in the ready position.

Turning to FIG. 8, in another variation, a conveyor stop 80 includes a paddle 82 connected to shaft 84 which is pivotally mounted in bearings 86 adjacent a first end 88 of the paddle, similar to the embodiment illustrated in FIG. 7. Paddle 82, in the normal or ready position is outside of conveying path 20. When electromagnet 90 is energized, paddle 82 is pivoted such that the second end 92 of paddle 82 is rotated into conveying path 20. When electromagnet 90 is de-energized, releasing paddle 82, the paddle rotates out of conveying path 20 under the force of gravity until the paddle contacts stop 94. Stop 94 retains paddle 82 in sufficient proximity to electromagnet 90 such that the magnet can attract and rotate the paddle when energized.

Figure 9:
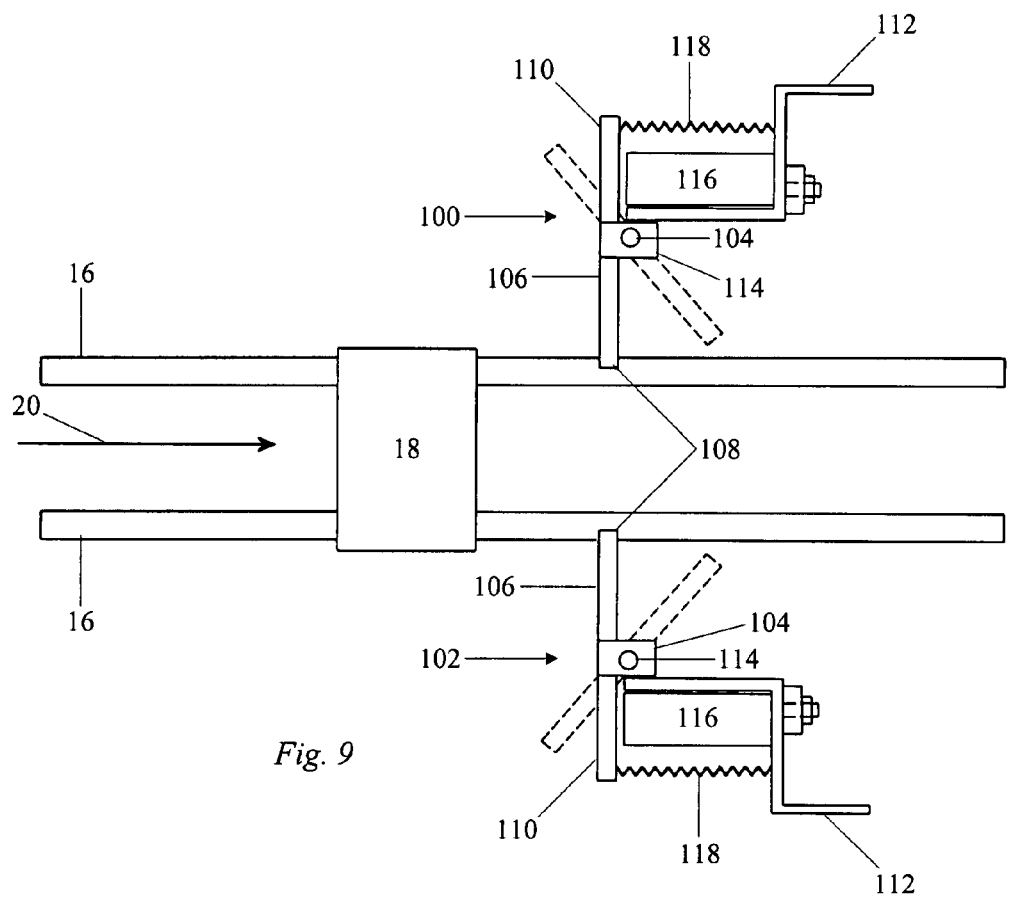
FIG. 9 is a top view of a conveyor wherein two stop assemblies are employed.

Referring to FIG. 9, a top view of another variation, a pair of conveyor stops 100, 102 in opposing, aligned positions on opposite sides of conveying path 20 include magnetically attractable paddles 106 having first and second ends 108, 110 pivotally mounted on frames 112 with shafts 114 and bearings 104. Each of shafts 114 defines a pivot axis on opposing sides of, and substantially perpendicular to, conveying path 20 around which paddles 106 rotate. An electromagnet 116 is mounted on each of frames 112 adjacent second ends 110 of each of paddles 106. A spring 118 connected between each of paddles 106 and frame 112 biases the paddles such that first ends 108 of the paddles extend into conveying path 20 when the conveyor stop is in the normal or ready position. Springs 118 are sized and tensioned such that a tub 18, traveling along conveying path 20, will push paddles 106 to the sides of the conveying path and continue traveling along the path when electromagnets 116 are de-energized. To activate stops 100, 102, electromagnets 116 are energized, creating magnetic fields that act on paddles 106 with sufficient force to hold the paddles in place when tub 18, traveling along conveying path 20, pushes against first ends 108 of the paddles. A single stop 100 located on one side only could be used, but would have to extend into the conveyor pathway a considerable distance in order to avoid problems with twisting or skewing the tub 18. It is preferred according to the invention that only a minor portion (less than 50%) of the total length of the paddle extend into the conveyor pathway, because this reduces the amount of magnetic force needed to operate the stop mechanism.

Positioning conveyor stops 100, 102 to the sides of conveyor path 20 in the manner illustrated in FIG. 9 permits the use of the stops in applications where a stop assembly such as stop 22 of FIG. 2 cannot be located under the conveying path. Such applications may include roller conveyors and belt conveyors having rollers and belts that span the width of the conveying path such that a stop member cannot be extended into the conveying path from below. In other instances, conveyor stops 100, 102 may be used where there is insufficient space between the conveyor and underlying structure to mount a stop beneath the conveyor.

Figure 10:
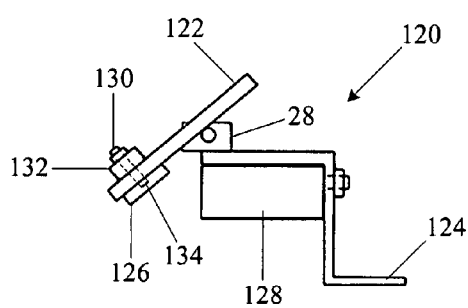
FIG. 10 is a side view of an alternate embodiment of a stop assembly of the invention.
Figure 5:
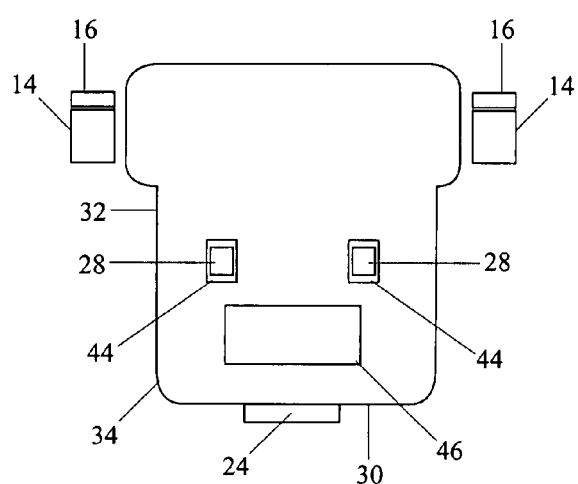
FIG. 5 is a front view of the stop assembly of FIG. 2.

Referring to FIG. 10, in another alternate embodiment, a conveyor stop 120 includes a stop paddle 122 pivotally mounted on a base 124 in the same manner as paddle 32 of FIG. 2. In this variation, counterweight 126 is positioned on the side of paddle 122 adjacent to electromagnet 128. Counterweight 126 is mounted on paddle 122 with a bolt or screw 130 that extends through a resilient damper 132 and the paddle and engages a threaded hole 134 in the counterweight. When electromagnet 128 is energized, holding paddle 122 in the upright position, damper 132 allows the stop paddle to move a limited distance when a tub 18 traveling on conveyor 12 pushes against the paddle. Allowing stop paddle 122 to move in this manner reduces the amount of force required to stop tub 18 traveling on conveyor 12 since the force is applied over the distance that the paddle moves when pushed by the tub. Reducing the amount of force that electromagnet 128 must apply to paddle 122 to stop tub 18 permits the use of a less powerful electromagnet.

Although various embodiments of the invention have been illustrated in the accompanying drawings and described in the foregoing detailed description, it will be understood that the invention is not limited to the embodiments disclosed but, as will be appreciated by those skilled in the art, is susceptible to numerous modifications and variations without departing from the spirit and scope of the invention as hereinafter claimed. For example, while the invention has been described in connection with a stop member comprising a paddle, it is contemplated that other geometries for the stop member may be utilized, for example a plurality of rods attached to and extending from a shaft. It is also contemplated that the stop member can be formed from non-magnetic materials, in which case a ferromagnetic counterweight or other structure attached to the member is acted on by the electromagnet. It is further contemplated that a conveyor stop assembly according to the invention may be positioned to the side of, or above the conveying path as well as beneath the conveying path. Conveyor stop assemblies according to the invention may also be utilized in applications other than mail processing.

The invention claimed is:

1. A conveyor stop assembly for use in a conveyor pathway on which objects travel, comprising:
 a frame positioned proximate the conveying pathway,
 an electromagnet mounted on the frame, and
 a magnetically attractable stop member mounted on a pivot for pivotal movement into and out of the conveying path, whereby energizing the electromagnet causes the stop member to become held to the electromagnet by magnetic force in a position in which an end portion of the stop member extends into the conveyor pathway to stop an object moving along the conveyor, and deenergizing the electromagnet releases the stop member from the electromagnet such that an object moving along the conveyor can pass the stop assembly.

2. The conveyor stop assembly of claim 1, further comprising means for causing the stop member to pivot to a ready position at which a contact portion of the stop member is in contact with or close proximity to the electromagnet when the electromagnet is deenergized.

3. The conveyor stop assembly of claim 2, wherein when the stop member is in the ready position, the end portion of the stop member extends into the conveyor pathway, such that an object moving on the conveyor contacts the end portion in passing and causes the stop member to pivot out of its way, after which the stop member pivots back to the ready position.

4. The conveyor stop assembly of claim 2, wherein when the stop member is in the ready position, the end portion of the stop member is clear of the conveyor pathway, such that an object moving on the conveyor can pass without contacting the stop member, and energizing the electromagnet causes the stop member to pivot from the ready position into contact with the electromagnet so that the end portion of the stop member extends into the conveyor pathway.

5. The conveyor stop assembly of claim 2 wherein the means for causing the stop member to pivot to the ready position comprises a counterweight.

6. The conveyor stop assembly of claim 2 wherein the means for causing the stop member to pivot to the ready position comprises a spring.

7. The conveyor stop assembly of claim 1 further comprising a resilient damper mounted on the frame positioned to compress and thereby permit the electromagnet to move a limited distance when the electromagnet is energized and an object impacts on the stop member.

8. The conveyor stop assembly of claim 1 wherein the stop member comprises a paddle mounted on the pivot, which paddle has a first wing extending away from the pivot that comprises the contact portion, and a second wing extending away from the pivot in the opposite direction from the first wing which includes the end portion that extends into the conveyor pathway.

9. The conveyor stop assembly of claim 8 wherein the pivot comprises a shaft secured to the stop member, the shaft having a pivot axis substantially perpendicular to the conveying path, and a bearing attached to the frame in which the shaft is mounted.

10. A conveyor stop assembly for stopping objects traveling along a conveying path comprising:
   a magnetically attractable stop member pivotally mounted for movement out of the conveying path when contacted by an object traveling along the conveying path; and
   an electromagnet that generates an electromagnetic field that acts on the stop member to hold the stop member in the conveying path and stop an object traveling along the conveying path when the electromagnet is energized.

11. The conveyor stop assembly of claim 10 further comprising means for biasing the stop member in position adjacent the electromagnet.

12. The conveyor stop assembly of claim 11 wherein the means for biasing the stop member is one of a spring or counterweight.

13. The conveyor stop assembly of claim 10 wherein the stop member comprises a paddle pivotally mounted for rotation of an end thereof into and out of the conveying path.

14. The conveyor stop assembly of claim 10 further comprising a resilient damper and wherein the electromagnet is mounted on the frame with the damper to allow the electromagnet to move a limited distance when the electromagnet is energized and an object impacts on the stop member.

15. The conveyor stop assembly of claim 10 further comprising a resilient damper and wherein the damper is mounted on the paddle to allow the paddle to move a limited distance when the electromagnet is energized and an object impacts on the stop member.

* * * * *